(12) United States Patent
Taylor

(10) Patent No.: US 12,442,539 B2
(45) Date of Patent: Oct. 14, 2025

(54) KITCHEN EXHAUST SYSTEMS AND METHODS OF OPERATION

(71) Applicant: Jeffrey Allen Taylor, Eagle, ID (US)

(72) Inventor: Jeffrey Allen Taylor, Eagle, ID (US)

( * ) Notice: Subject to any disclaimer, the term of this patent is extended or adjusted under 35 U.S.C. 154(b) by 550 days.

(21) Appl. No.: 17/759,589

(22) PCT Filed: Jan. 26, 2021

(86) PCT No.: PCT/US2021/015021
§ 371 (c)(1),
(2) Date: Jul. 27, 2022

(87) PCT Pub. No.: WO2021/154685
PCT Pub. Date: Aug. 5, 2021

(65) Prior Publication Data
US 2023/0061986 A1 Mar. 2, 2023

Related U.S. Application Data

(60) Provisional application No. 62/967,153, filed on Jan. 29, 2020.

(51) Int. Cl.
*F24C 15/20* (2006.01)
(52) U.S. Cl.
CPC ..................... *F24C 15/20* (2013.01)
(58) Field of Classification Search
None
See application file for complete search history.

(56) References Cited

U.S. PATENT DOCUMENTS

| 2,748,688 A | 6/1956 | Smith |
| 3,786,739 A | 1/1974 | Wright |
| 4,186,727 A | 2/1980 | Anderson et al. |

(Continued)

FOREIGN PATENT DOCUMENTS

| CN | 110397974 A | 11/2019 |
| EP | 0732548 A1 | 9/1996 |

(Continued)

OTHER PUBLICATIONS

International Search Report and Written Opinion from International Application No. PCT/US2021/015021 mailed Apr. 9, 2021.

(Continued)

*Primary Examiner* — Ko-Wei Lin
(74) *Attorney, Agent, or Firm* — Ballard Spahr LLP

(57) ABSTRACT

A kitchen exhaust system includes a hood, a vapor passage, a cold air induction system configured to produce cold air, and a mixing chamber. The hood is configured to collect grease-laden vapors from a cooking area. The mixing chamber is fluidly coupled to the hood through the vapor passage to receive the grease-laden vapors from the cooking area and fluidly coupled to cold air induction system to receive the cold air produced by the cold air induction system. The mixing chamber has one or more walls, a grease drain, and a vapor exhaust. The one or more walls are positioned in the mixing chamber create turbulence of air flow formed from the cold air and the grease-laden vapors. The cold air and the turbulence of the air flow separate at least a portion of the grease from the grease-laden vapors.

31 Claims, 9 Drawing Sheets

(56) References Cited

U.S. PATENT DOCUMENTS

| | | | |
|---|---|---|---|
| 4,822,385 A | | 4/1989 | Strege et al. |
| 5,906,195 A | * | 5/1999 | Georgaras ............... F24C 15/20 |
| | | | 126/299 R |
| 9,581,337 B2 | | 2/2017 | Heinonen |
| 2007/0135031 A1 | | 6/2007 | Vlamis |
| 2009/0019822 A1 | * | 1/2009 | Feisthammel ...... F24C 15/2035 |
| | | | 55/385.4 |
| 2016/0279556 A1 | | 9/2016 | Law |

FOREIGN PATENT DOCUMENTS

| | | |
|---|---|---|
| EP | 2040817 B1 | 11/2011 |
| FR | 2301778 A1 | 9/1976 |
| FR | 2528716 A1 | 12/1983 |
| KR | 20110003878 A | 1/2011 |
| KR | 101962109 B1 | 3/2019 |
| RU | 2687909 C1 | 5/2019 |
| WO | 2007147597 A1 | 12/2007 |

OTHER PUBLICATIONS

U.S. Appl. No. 62/967,153, filed Jan. 29, 2020.

\* cited by examiner

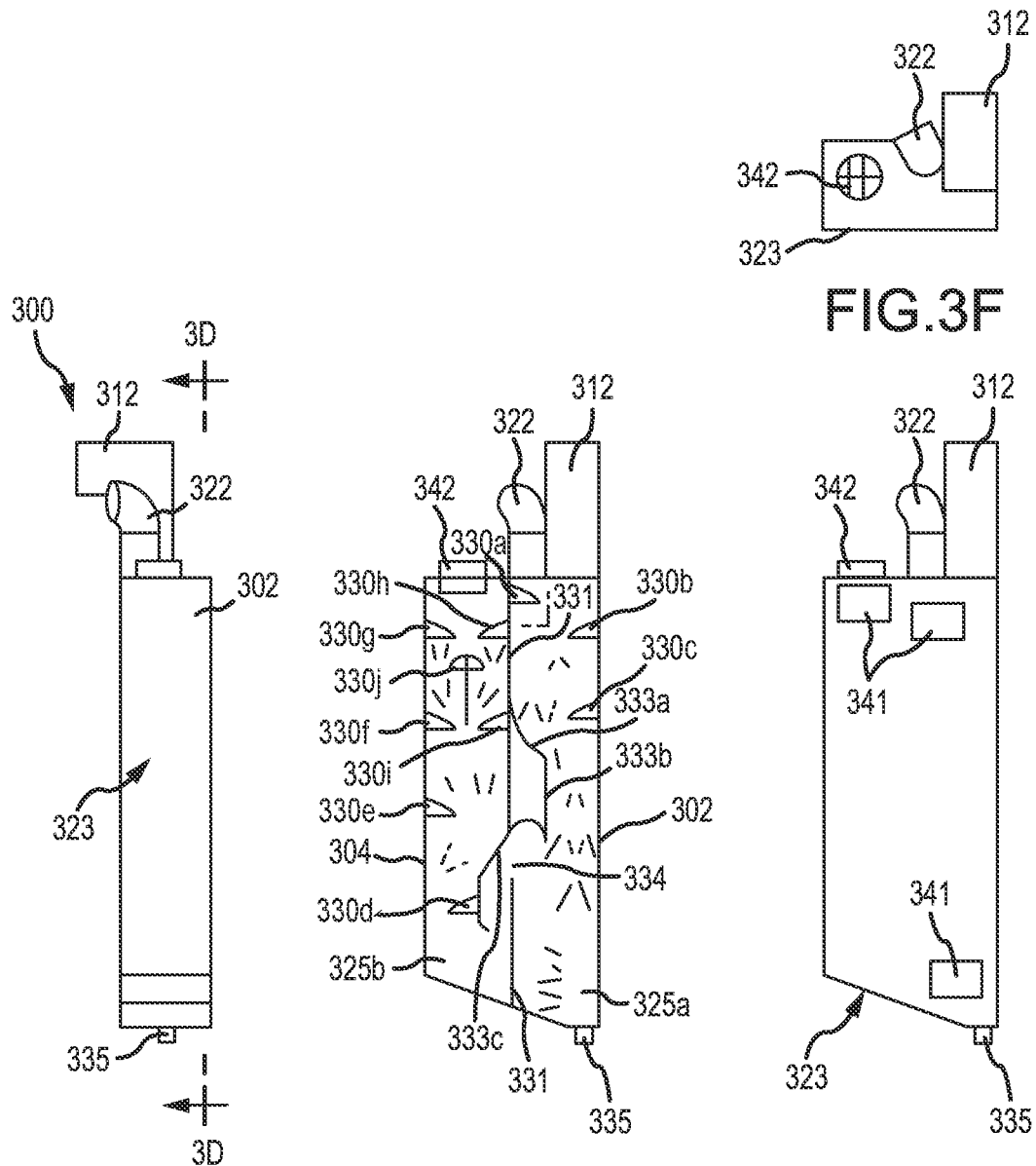

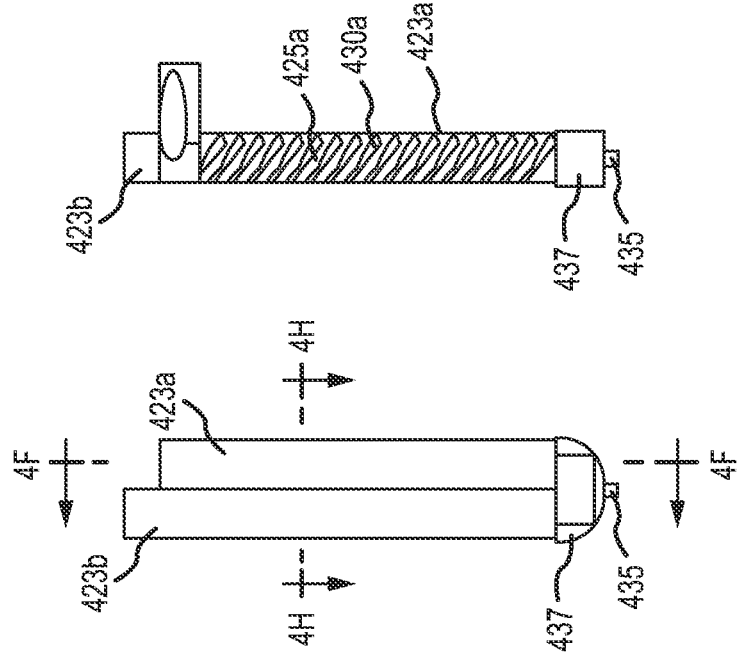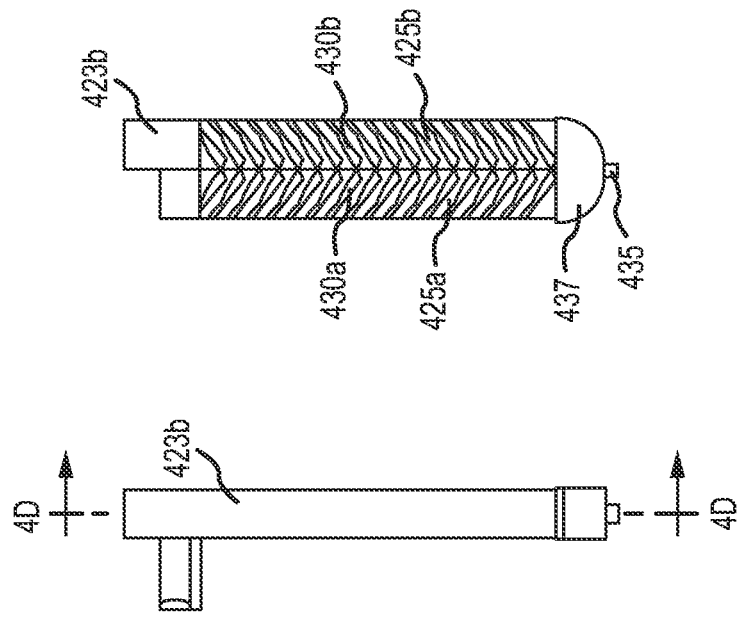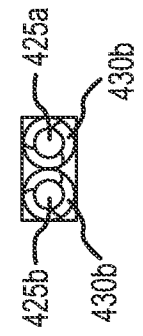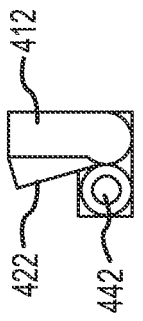

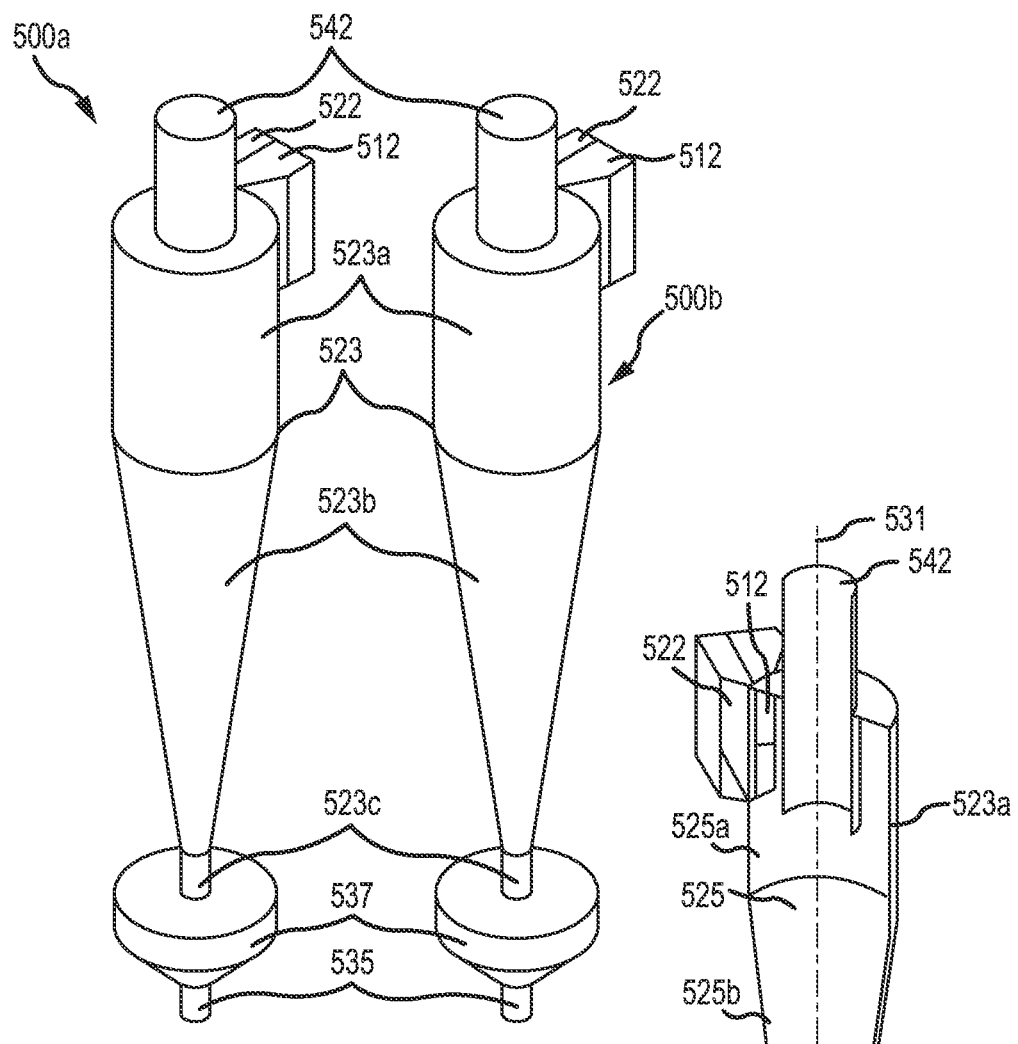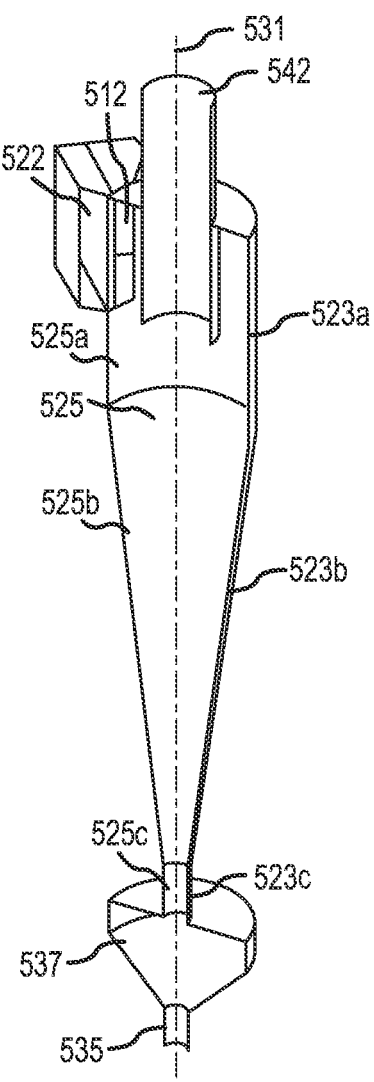
FIG.5A
FIG.5B

KITCHEN EXHAUST SYSTEMS AND METHODS OF OPERATION

CROSS-REFERENCE TO RELATED APPLICATIONS

This application is a U.S. Nationalization of PCT International Application No. PCT/US2021/015021, filed on Jan. 26, 2021, which claims priority to U.S. Provisional Patent Application No. 62/967,153 filed on Jan. 29, 2020, the disclosure of which is incorporated herein, in its entirety, by this reference.

BACKGROUND

Many kitchens, especially commercial kitchens, include an air exhaust system to remove fat and oil-laden vapors from the cooking area and kitchen. In conventional air exhaust systems, fat and oil-laden vapor is released into the air at an exhaust fan for the air exhaust systems. The fat and oil-laden vapor is then dispersed into the environment. Fat and oil also may collect around the exhaust fan, creating slippery and damaging conditions on the building around the air exhaust fan. The grease also may be washed from the roof by rain and melting snow or ice, thereby introducing grease into the environment.

SUMMARY

Embodiments disclosed herein are related to kitchen exhaust systems and methods of removing grease from grease-laden vapors. In an embodiment, a kitchen exhaust system includes a housing at least partially defining a mixing chamber. The housing includes a vapor intake port adapted to fluidly couple to a hood that collects grease-laden vapors from a cooking area effective to receive the grease-laden vapors from the cooking area. The housing also includes a cold air intake adapted to fluidly couple to a cold air induction system that produces cold air effective to receive the cold air produced by the cold air induction system. The housing also includes one or more walls positioned to create turbulence of air flow formed from the cold air and the grease-laden vapors. The cold air and the turbulence of the air flow separate at least a portion of grease from the grease-laden vapors. The housing also includes a drain positioned at a bottom region of the mixing chamber to collect the portion of the grease separated from the grease-laden vapors. The housing also includes a vapor exhaust positioned at a top region of the mixing chamber distal to the bottom region to allow vapor having at least the portion of the grease removed therefrom to exit the mixing chamber.

In an embodiment, a method of separating grease from grease-laden vapors includes introducing grease-laden vapors from a cooking area into a mixing chamber at least partially defined by a housing. The method also includes introducing cold air produced by a cold air induction system into the mixing chamber. The method also includes separating grease from the grease-laden vapors by creating turbulence of air flow formed from the cold air and the grease-laden vapors in the mixing chamber with one or more walls in the mixing chamber. The method also includes collecting at least a portion of the grease separated from grease-laden vapors in a collection box below a drain at a bottom region of the mixing chamber. The method also includes exhausting vapor having at least the portion of the grease removed therefrom through a vapor exhaust on the mixing chamber.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

FIG. 3A-3F are views of a kitchen exhaust system, according to an embodiment.

FIG. 4A-4H are views of a kitchen exhaust system, according to an embodiment.

FIGS. 5A-5B are views of a kitchen exhaust system, according to an embodiment.

DETAILED DESCRIPTION

Figure 1:
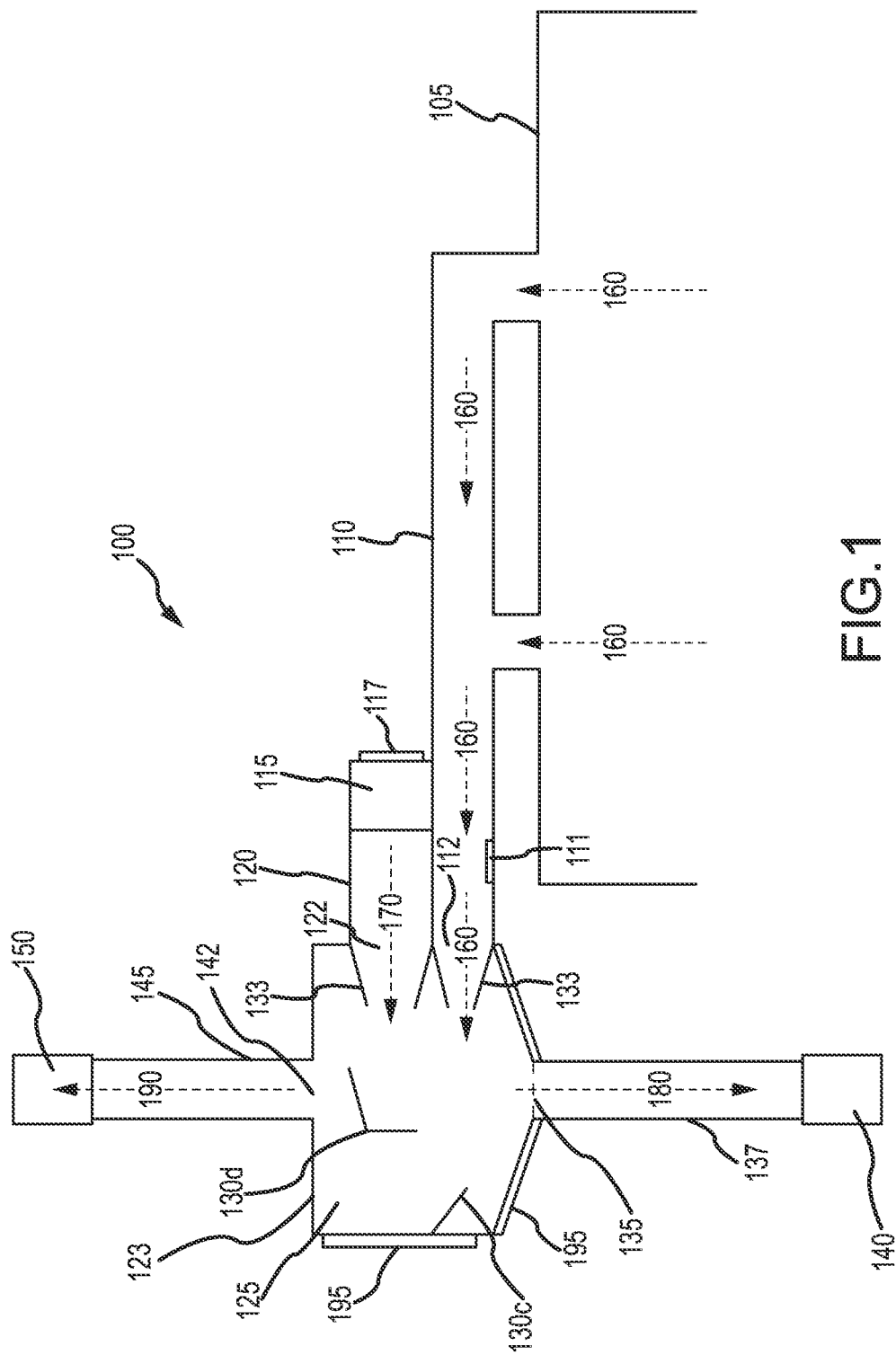
FIG. 1 is block diagram of a kitchen exhaust system, according to an embodiment.

Embodiments disclosed herein are related to kitchen exhaust systems and methods of separating grease from grease-laden vapors with kitchen exhaust systems. The kitchen exhaust systems and the methods of operation described herein remove a significant amount of fat and oil from the vapors before the vapors exit the system through the exhaust fan. The kitchen exhaust systems and the methods of operation described herein, then, significantly reduce or eliminate fat and oil-laden vapor from being released into the environment and creating slippery and damaging conditions on the building around the air exhaust fan. Because the fat and oil on the roof also may be washed from the roof by rain and melting snow or ice, removing the fat and oil from the vapors mitigates fat and oil from being introduced into streams and rivers via storm drains. The fat and oil removed from the vapor may be collected in many of the kitchen exhaust systems described herein, thereby allowing the collected fat and oil to be recycled. The fat and oil removed from the vapor can include any fats and oils common to the cooking process, such as saturated fats, unsaturated fats (monounsaturated fats, polyunsaturated fats), and trans fats. The fats and oils common to the cooking process are collectively referred to as "grease" herein.

In some embodiments, a kitchen exhaust system includes a cold air induction system, a mixing chamber, a grease collection box, and an exhaust fan. Some kitchen exhaust systems may include a hood that is configured to collect vapors, including grease-laden vapors, from a cooking area. The mixing chamber is in fluid communication with both the hood and the cold air induction system. The kitchen exhaust system also includes a grease collection box at the bottom of the mixing chamber. A draw or drain may fluidly couple the collection box with the mixing chamber.

The cold air induction system is configured to introduce cold or cooled air into the mixing chamber. The cold air induction system includes a cooling unit configured to cool and/or regulate the temperature of cold air introduced into the mixing chamber. For example, the cold air introduced into the mixing chamber by the cold air induction system may be between −5° C. and 5° C. The cold air introduced into the mixing chamber by the cold air induction system may be post-filter and post-plenum cold air. That is, the cold air introduced into the mixing chamber by the cold air induction system is not pre-filter and pre-plenum air. The cold air induction system may be retro-fit to pre-existing kitchen exhaust systems.

In operation, the grease-laden vapors may be drawn into the mixing chamber through the hood. One or more fans may direct the grease-laden vapors from the hood into the mixing chamber of the kitchen exhaust system. Upon activation, the cold air induction system introduces cold air into the mixing chamber. One or more walls are positioned in or at least partially defining the mixing chamber to increase turbulence of air flow in the mixing chamber. Turbulence of the air flow in the mixing chamber may more effectively mix the cold air and the grease-laden vapors. When the cold air is mixed with the grease-laden vapors in the mixing chamber, the grease in the grease-laden vapor in the mixing chamber cools and drops from the air flow to the bottom of mixing chamber. The grease that has separated from the vapor in the air flow passes through the draw or drain at the bottom of the mixing chamber to the grease collection box. In some embodiments, one or more (e.g., all) inner surfaces of the mixing chamber may be coated with a friction-reducing material, such as Teflon, or a grease repellant to inhibit grease from sticking to the one or more inner surfaces of the mixing chamber and promote grease moving to the drain. The grease collection box may be removed for environmentally friendly disposal of the grease or re-use of the grease. The remaining vapor exits through the exhaust fan.

FIG. 1 is a block diagram of a kitchen exhaust system 100 according to an embodiment including a hood 105, a housing 123 at least partially defining a mixing chamber 125 and having a cold air intake port 122, a vapor intake port 112, a vapor passage 110 providing fluid communication between the hood 105 and the mixing chamber 125 through the vapor intake port 112, a cold air induction system 115, a cold air passage 120 providing fluid communication between the cold air induction system 115 and the mixing chamber 125 through the cold air intake port 122, a drain 135 in the mixing chamber 125, and an exhaust passage 145 in fluid communication with the mixing chamber 125. The hood 105 may include any of a number of different hoods used in kitchen exhaust systems. The hood 105 is typically positioned over a cooking area to collect vapors, such as grease-laden vapors 160, formed during cooking. The vapor passage 110 extends between the mixing chamber 125 and the hood 105 to provide fluid communication between the hood 105 and the mixing chamber 125. The vapor passage 110 may include any of a number of different vapor passages used in kitchen exhaust system. Although not shown in in FIG. 1, the kitchen exhaust system 100 may include one or more fans in the hood 105 or the vapor passage 110. The one or more fans may be configured to pull vapors, such as grease-laden vapors 160, from the cooking area into the hood 105 and direct the vapors through the vapor passage 110 to the mixing chamber 125.

The cold air induction system 115 is positioned to force cold air 170 into the mixing chamber 125 through the cold air passage 120 and the cold air intake port 122. The cold air passage 120 is positioned outside the mixing chamber 125. Although shown as a single cold air induction system 115 in FIG. 1, the kitchen exhaust system may include multiple cold air induction systems 115. The cold air induction system 115 and the cold air passage 120 may be configured to be retro-fit to a pre-existing kitchen exhaust system including a hood 105 and exhaust passage 145. The cold air induction system 115 includes a cooling unit configured to cool and/or regulate the temperature of cold air 170 introduced into the mixing chamber 125. The cold air 170 introduced into the mixing chamber 125 by the cold air induction system 115 may be post-filter and post-plenum cold air. That is, the cold air 170 introduced into the mixing chamber 125 by the cold air induction system 115 is not pre-filter and pre-plenum air. Although shown above the vapor passage 110 and hood 105 in FIG. 1, the cold air induction system 115 and cold air passage 110 may be positioned elsewhere relative to the vapor passage 110. For example, the cold air passage 115 may be positioned to direct cold air 170 into the mixing chamber opposite to the vapor passage 110.

The cold air induction system 115 may be configured to direct the cold air 170 into the mixing chamber 125 at a predetermined cubic feet per minute (CFM). The CFM of the cold air 170 introduced into the mixing chamber 125 may vary depending on the size of the hood and the type of cooking equipment. For example, a larger sized hood may require a greater CFM than a smaller sized hood. In some embodiments, the CFM of the cold air 170 flowing into the mixing chamber 125 may vary depending upon the temperature of the grease-vapors 160 or the volume of grease in the grease-laden vapors. The cold air induction system 115 may include a controller 117 configured to allow selection of a CFM of the cold air 170 and direct the cooling unit in the cold air induction system 115 to produce the cold air 170 at the selected CFM. The vapor passage 110 may include one or more sensors 111 wired or wirelessly coupled to the controller 117 and configured to detect at least one of a temperature of the grease-laden vapors 160 or volume of grease in the grease-laden vapors 160. The controller 117, then, may determine a CFM of the cold air 170 based on at least one of the temperature of the grease-laden vapors 160 or the volume of grease in the grease-laden vapors.

The temperature of the cold air 170 introduced into the mixing chamber may be about −30° C. to about 20° C., about −20° C. to about −15° C., about −15° C. to about −10° C., about −10° C. to about −5° C., about −5° C. to about 0° C., about 0° C. to about 5° C., about 5° C. to about 10° C., about 10° C. to about 15° C., less than about 15° C., less than about 10° C., less than about 5° C., less than about 0° C., less than about −5° C., less than about −10° C., less than about −15° C., less than about −20° C., less than about −25° C., less than about −30° C., about −30° C., about −25° C., about −20° C., about −15° C., about −10° C., about −5° C., about 0° C., about 5° C., about 10° C., about 15° C., or about 20° C.

In some embodiments, the cold air induction system 115 is configured to produce a selected temperature of cold air 170. For example, different temperatures may be more favorable for removing grease from particular grease-laden vapors 160 or different volumes of grease expected to be in the grease-laden vapors 160. The selected temperature may include any of the ranges or temperatures of cold air 170 described above. In some embodiments, the controller 117 is configured to allow selection of a selected temperature of the cold air 170 and direct the cooling unit in the cold air induction system 115 to produce the selected temperature of the cold air 170. The controller 117 may be configured to automatically select a temperature of the cold air 170 based on the temperature or volume of grease in the grease-laden vapors 160 sensed by the sensor 111 in the vapor passage 110 or hood 105.

The mixing chamber 125 at least partially defined by the housing 123 is positioned to receive cold air 170 from the cold air induction system 115 through the cold air intake port 122 and the grease-laden vapors 160 from the hood 105 through the vapor intake port 112. For example, the mixing chamber 125 may be positioned to the side of the hood 105, behind the hood 105, or above the hood 105. The housing 123 may include and/or define a drain 135 at a bottom region of the mixing chamber 125 and an exhaust opening 142 at a top region of the mixing chamber 125. The housing 123 at least partially defining the mixing chamber 125 may be configured to retro-fit with at least one of a hood 105, vapor passage 110, or exhaust passage 145 in a pre-existing kitchen exhaust system. For example, the vapor intake port 112 of the mixing chamber 125 may be positioned to align with the vapor passage 110 and the exhaust opening 142 may be positioned to align with the exhaust passage 145. To meet local code requirements, the mixing chamber 125 may be water tight and continuously welded to the vapor passage 110, the cold air passage 120, the exhaust passage 145, and the drain 135.

The mixing chamber 125 is further configured to mix the cold air 170 with the grease-laden vapors 160 to remove at least a portion of the grease 180 from the grease-laden vapors 160. Mixing the cold air 170 with the grease-laden vapors 160 reduces the temperature of the grease-laden vapors such that at least a portion of the grease in the grease-laden vapor cools and drops from the vapor. In some embodiments, at least about 95%, at least about 90%, at least about 80%, at least about 70%, at least about 60%, or at least about 50% of grease may be removed from the grease-laden vapors 160 before the vapors 190 exit the mixing chamber 125. The vapors 190 exiting the mixing box 125 may be cooled to less than about 25° C., less than about 20° C., less than about 15° C., less than about 10° C., or less than about 5° C. before exiting the mixing chamber 125 through the exhaust opening 142.

The mixing chamber 125 may include one or more features to increase air turbulence within the mixing chamber 125. With increased air turbulence within the mixing chamber 125, grease in the grease-laden vapors 160 is more likely to separate from the vapor and collect in the mixing chamber 125. Features to increase air turbulence may include one or more walls strategically positioned in the mixing chamber 125 to increase air turbulence. For example, the housing 123 may include funneling walls 133 on one or more (e.g., both) of the cold air intake port 122 and the vapor intake port 112. The funneling walls 133 may extend at least partially into the mixing chamber 125. The funneling walls 133 increase CFM of the grease-laden vapors 160 or the cold air 170 entering the mixing chamber 125 which, in turn, increase the turbulence of the air flow in the mixing chamber 125. The funneling walls 133 may narrow a diameter of the cold air intake port 122 and/or the vapor intake port 112 by angling towards one another.

The housing 123 also may include one or more walls 130c secured to a sidewall of the housing 123 to extending into the mixing chamber 125. For example, one or more walls 130c may be secured to a sidewall of the housing 123 that is generally opposite or distal to one or more (e.g., both) of the cold air intake port 122 and/or the vapor intake port 112. The one or more walls 130c may include a face or surface at least partially oriented towards the cold air intake port 122 and/or the vapor intake port 112. In some embodiments, the housing 123 may include (1) a wall secured to the housing 123 distal to and generally aligned with the cold air 170 flow entering the mixing chamber through the cold air intake port 122 and having a face generally oriented towards the vapor intake port 112 and (2) a wall secured to the housing 123 distal to and generally aligned with the grease-laden vapor 160 flow entering the mixing chamber 125 through the vapor intake port 112 and having a face generally oriented towards the cold air intake port 122. These walls may direct cold air 170 and the grease-laden vapor 160 towards one another effective to create turbulence and/or mixing of the cold air 170 and the grease-laden vapor 160.

In some embodiments, one or more walls 130d are positioned within the mixing chamber 125 to direct the cold air 170 from the cold air intake port 122 towards the grease-laden vapors 160 entering the mixing chamber 125 from the vapor passage 110. The one or more walls 130d may be positioned in the mixing chamber 125 between the cold air intake port 122 and a sidewall of the housing 123 distal to the cold air intake port 122. In some embodiments, the one or more walls 130d may include a face directed to the vapor intake port 122. In some embodiments, the one or more walls 130d may include a first face generally perpendicular to the cold air intake port 122 and a second face generally oriented towards the vapor intake port 112 effective to direct the cold air 170 entering the mixing chamber 125 towards the grease-laden vapor 160 entering the mixing chamber. In some embodiments, the kitchen exhaust system 100 may include the wall 130c aligned with the air flow entering the mixing chamber 125 through the vapor intake port 112 secured to the sidewall and having a face oriented towards the wall 130d positioned in the mixing chamber 125 to be aligned with the cold air 170 flow entering the mixing chamber 125 through the cold air intake port 122.

The housing 123 may include a sloped or tapered bottom at a bottom region of the mixing chamber 125 directing grease 180 separated from the grease-laden vapors 160 to the drain 135. The drain 135 may be positioned at a bottom of the mixing chamber 125 and includes one or more openings in the housing 123 sized to allow the grease 180 to exit the mixing chamber 125. At least a portion of a passage 137 of the drain 135 between the drain 135 and the grease collection box 140 may be heated to promote flow of grease to the grease collection box 140. The housing 123 also includes an exhaust opening 142 on a top or sidewall of the mixing chamber 125. The exhaust opening 142 is positioned to allow vapors 190 having at least a portion of the grease 180 removed therefrom to exit the mixing chamber 125. In some embodiments, the housing 123 includes one or more inner surfaces coated with or including at least one of a grease repellant or a friction-reducing material, such as Teflon. The grease repellant or the friction-reducing material may inhibit grease from sticking to the one or more inner surfaces of the mixing chamber 125 and promote grease moving to the drain 135.

The kitchen exhaust system 100 also may include one or more heating elements 195 secured to one or more walls of the housing 123 at least partially defining the mixing chamber 125. The one or more heating elements 195 are configured to keep grease removed from the grease-laden vapors moving to the drain 135 rather than solidifying on one or more walls of the housing 123. For example, in the kitchen exhaust system 100 shown in FIG. 1, heating elements 195 are secured to a sidewall and the sloped bottom of the housing 123. The heating elements 195 may include a hot water jacket secured to one or more walls of the housing 123.

The kitchen exhaust system 100 also may include a grease collection box 140 in fluid communication with the mixing chamber 125 through at least one of the drain 135 and the passage 137. The grease collection box 140 may be detachably secured to the drain 135, allowing the grease collection box 140 to be replaced with a different grease collection box. Grease collected in the grease collection box 140 may be rendered and reused rather than be dispelled into the air through with other vapors.

The kitchen exhaust system 100 also may include an exhaust passage 145 in fluid communication with the mixing chamber 125 through the exhaust opening 142. An exhaust fan 150 may be connected to the exhaust passage 145 to draw vapors 190 having at least a portion of the grease removed therefrom from the mixing chamber 125. The exhaust fan 150 may be positioned on an exterior of a building, such as a roof or an exterior wall.

Figure 2A:
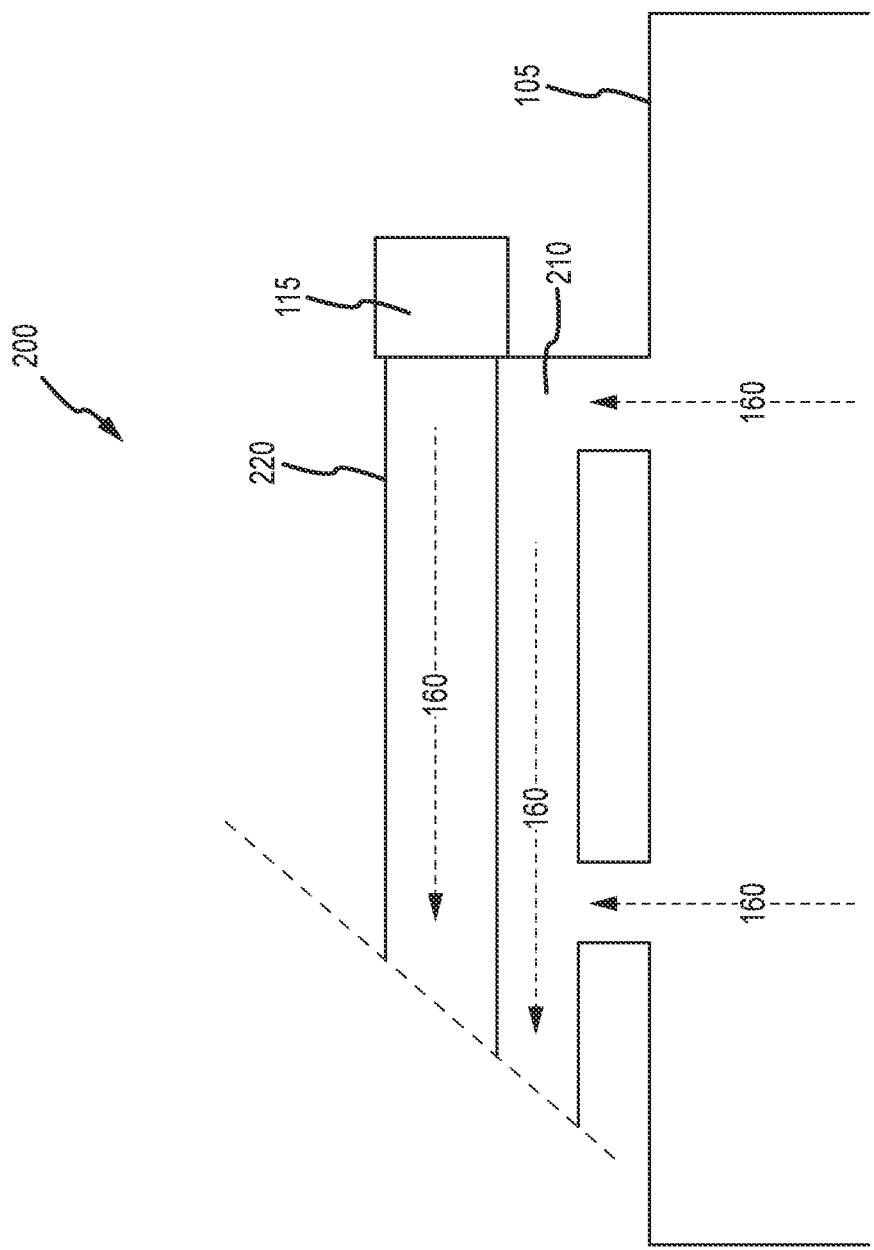
FIG. 2A is a side view of a hood portion of a kitchen exhaust system, according to an embodiment.
Figure 2B:
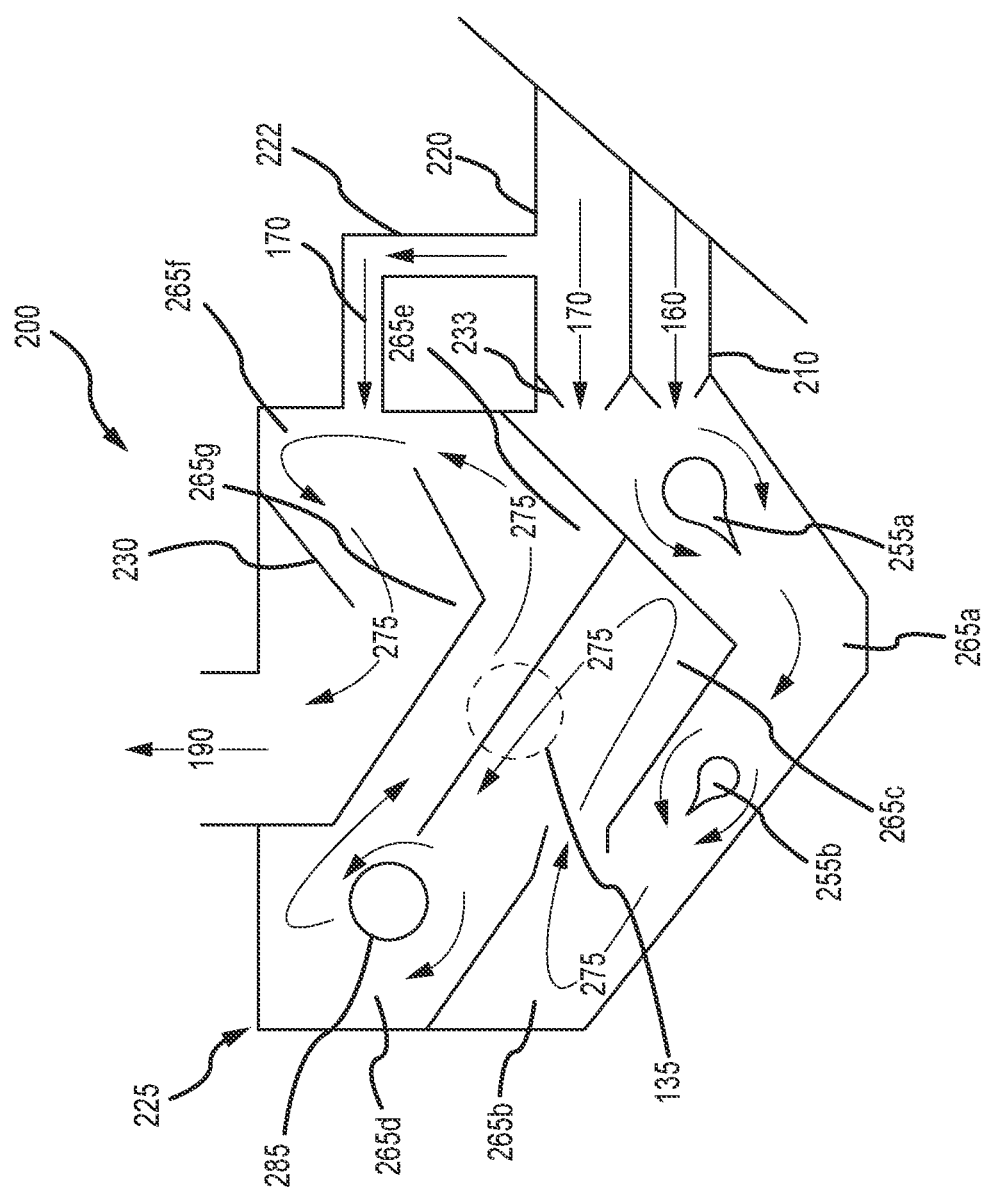
FIG. 2B is a top view of a kitchen exhaust system, according to an embodiment.

FIG. 2A is a side view of a hood 105 of a kitchen exhaust system 200 and FIG. 2B is a top view of a mixing chamber 225 of a kitchen exhaust system 200, according to an embodiment. Unless otherwise noted, the kitchen exhaust system 200 may include any of the features or elements of the kitchen exhaust system 100 described above, such as a hood 105, a cold air induction system 110, a drain 135, a controller 117 (not shown), a grease collection box (not shown), an exhaust passage 145 (not shown), or an exhaust fan 150 (not shown). To meet local code requirements, the mixing chamber 225 may be water tight and continuously welded to the vapor passage 210, the cold air passage 220, the exhaust passage 145, and the drain 135.

With reference to FIG. 2A, the kitchen exhaust system 200 includes a vapor passage 210 extending between the hood 105 and the mixing chamber 225 and configured to provide fluid communication between the hood 105 and the mixing chamber 225, thereby allowing grease-laden vapors 160 collected in the hood 105 to pass to the mixing chamber 225. The kitchen exhaust system 200 also includes a cold air passage 220 configured to provide fluid communication between the cold air induction system 115 and the mixing chamber 225. The cold air passage 220 is positioned outside the mixing chamber 225.

With reference to FIG. 2B, the mixing chamber 225 is configured to mix the grease-laden vapors 160 with the cold air 170 to create an air flow 275 of combined cold air 170 and grease-laden vapors through the mixing chamber 225. The mixing chamber 225 includes a plurality of interior walls 230 positioned to direct the air flow 275 in the mixing chamber 225 and increase turbulence and turns 265 in the air flow 275. The turns 265 in the air flow 275 create a centripetal force that causes the cooling, heavier grease particles in the grease-laden vapor 160 in the air flow 275 to fall or separate from the air flow 275. In the embodiment shown in FIG. 2B, the plurality of interior walls 230 are positioned in the mixing chamber 225 to create turns 265a, 265b, 265c, 265d, 265e, 265f, and 265g in the air flow 275. Each of the turns 265a, 265b, 265c, 265d, 265e, 265f, and 265g in the air flow 275 promote separation of the grease from the air flow 275 for collection in the drain 135 of the mixing chamber 225. One or more of the interior walls also may be positioned in a conical configuration to increase a speed of the air flow 275 through the mixing chamber 275 before a turn 265.

The mixing chamber 225 also may include one or more funneling walls 233 to increase CFM of the grease-laden vapors 160, the cold air 170, or the air flow 275. For example, the funneling walls 233 may be positioned at the exit or within at least one of the vapor passage 210 or the cold air passage 220. One or more funneling walls 233 also may be positioned in at least one opening formed between two interior walls 230.

The mixing chamber 225 also may include one or more air foils 255 in the mixing chamber 225. Each of the one or more air foils 255 is configured to speed up the air flow 275 on one side of the air foil 255 and slow down the air flow 275 on the other side of the air foil 255 to promote separation of grease from the air flow 275. For example, the mixing chamber 225 includes a first air foil 255a positioned in the air flow 275 between the first turn 265a and both the vapor passage 210 and the cold air passage 220. The mixing chamber 225 also includes a second air foil 255b position in the air flow 275 between the first turn 265a and the second turn 265b. Other air foils 255 may be positioned at other areas in the air flow 275 of created in the mixing chamber 225. The mixing chamber 225 also may include a cylinder 285 positioned in the air flow 275 to split the air flow 275 and create additional centripetal force on the grease in the air flow 275.

The kitchen exhaust system 200 also includes an additional cold air passage 222 providing an additional cold air inlet into the mixing chamber 225. The additional cold air passage 222 is fluidly coupled to the cold air passage 220 to receive cold air 170 produced by the cold air induction system 115. In other embodiments, an additional cold air induction system may produce cold air 170 that is passed through the additional cold air passage 222 into the mixing chamber 225 at a different area than the cold air passage 210.

As the air flow 275 progresses through the elongated air flow path in the mixing chamber 225 created by the plurality of interior walls 230, the air flow 275 may increase in temperature. Introducing cold air at one or more additional areas in the mixing chamber 225 may cool the air flow to more desirable temperatures for separation of grease from the air flow 275.

As the grease is separated from the air flow 275, the grease may fall to the bottom of the mixing chamber 225 for collection. Although not shown from the top view of FIG. 2B, the mixing chamber 225 may include a tapered or sloped bottom that directs grease separated from the air flow 275 to the drain.

Figure 3A:
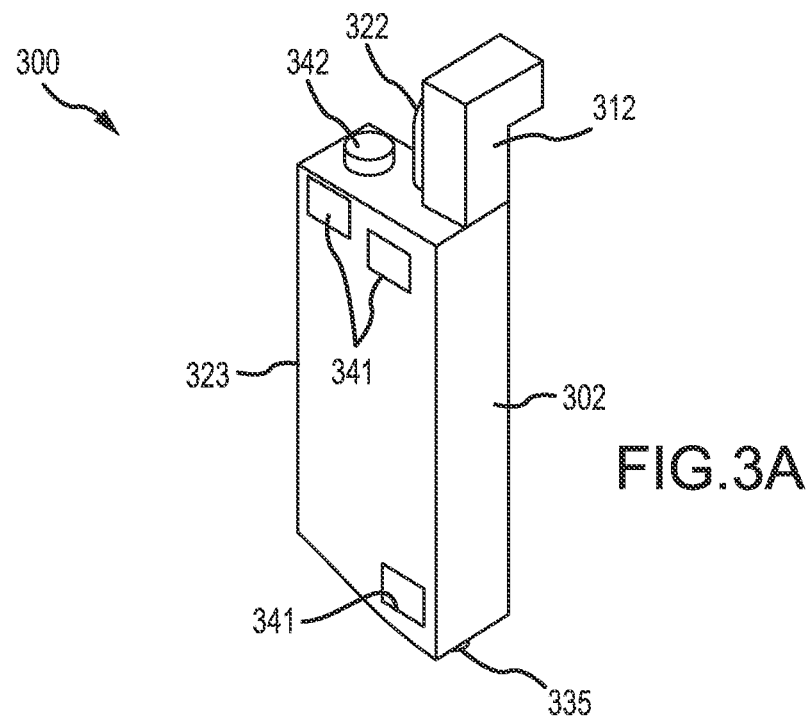
Figure 3B:
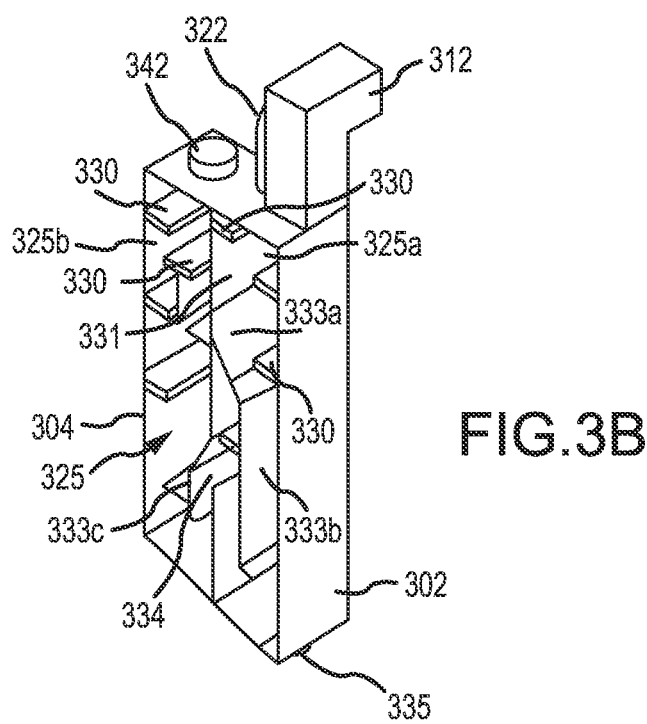

FIGS. 3A-3F are views of a kitchen exhaust system 300, according to an embodiment. Specifically, FIG. 3A is a front isometric view, FIG. 3B is a front isometric view with a front wall of the housing 123 removed, FIG. 3C is a side view of the kitchen exhaust system 300, FIG. 3D is a cross-sectional view of the kitchen exhaust system 300 taken along line 3D-3D in FIG. 3C, FIG. 3E is a front view of the kitchen exhaust system 300, and FIG. 3F is a top view of the kitchen exhaust system 300. Although not shown in FIGS. 3A-3F, one or more (e.g., all) of the hood 105, the vapor passage 110, the sensor 111, the cold air induction system 115, the controller 117, the cold air passage 120, the exhaust passage 145, and/or the exhaust fan 150 may be included with the kitchen exhaust system 300. The kitchen exhaust system 300 may be used or retrofit for use with one or more (e.g., all) of the hood 105, the vapor passage 110, the exhaust passage 145, and/or the exhaust fan 150. Unless otherwise noted, the kitchen exhaust system 300 may include any aspect of the kitchen exhaust systems 100, 200, such as the materials, components, referenced temperatures, referenced CFMs, and so on.

Turning specifically to FIG. 3A, the kitchen exhaust system 300 includes a housing 323 having a vapor intake port 312 configured to fluidly connect the housing 323 with the hood 105 in cooking or kitchen area, a cold air intake port 322 configured to fluidly connect the housing 323 with the cold air induction system 115, an exhaust opening 342 at a top region of the housing 323, and a drain 335 at a bottom region of the housing 323 distal to the exhaust opening 342. The housing 323 also may include one or more cleanout hatches 341 positioned on a side or front wall of the housing 323 that allow cleaning of the interior of the housing 323.

Turning to FIG. 3B, the housing 323 may at least partially define a mixing chamber 325 that receives the grease-laden vapors through the vapor intake port 312 and the cold air through the cold air intake port 322. In some embodiments, the housing 323 includes a central wall 331 extending at least partially between a top region of the mixing chamber 325 and a bottom region of the mixing chamber 325. The central wall 331 may be secured to a top wall of the housing 323 and a bottom wall of the housing 323, and/or secured to a front or rear wall of the housing 323. In some embodiments, the central wall 331 divides a first portion 325a of the mixing chamber 325 and a second portion 325b of the mixing chamber 325. The central wall 331 also may at least partially define an opening 334 that provides fluid communication between the first portion 325a and the second portion 325b of the mixing chamber 325. In some embodiments, both the vapor intake port 312 and the cold air intake port 322 are positioned in or connected to the first portion 325a and the top region of the mixing chamber 325. The vapor exhaust opening 342 may be positioned in or connected to the second portion 325b and the top region of the mixing chamber 325.

The drain 335 may be positioned in the first portion 325a and the bottom region of the mixing chamber 325. The bottom wall of the housing 323 may slope from the second portion 325b of the mixing chamber 325 to the drain 335 in the first portion 325a of the mixing chamber 325. In some embodiments, a gap or space is present between the bottom wall of the housing 323 and the central wall 331 to allow grease collected in the second portion 325b to slide to the drain 335 on the first portion 325a of the mixing chamber 325. In some embodiments, a different drain 335 is positioned on the bottom wall for each of the first portion 325a and the second portion 325b of the mixing chamber 325, with the bottom wall of the housing 323 sloping to each different drain 335.

The kitchen exhaust system 300 includes one or more walls positioned to create turbulence of the air flow formed from the cold air and the grease-laden vapors entering the mixing chamber 325. In some embodiments, the one or more walls include at least a wall 333 extending from the central wall 331 into the first portion 325a of the chamber 325. The wall 333 may include a first region 333a including a face at least partially oriented towards the top region of the first portion 325a and/or the cold air intake port 322 and the vapor intake port 322. For example, the first region 333a may be connect to the central wall 331 and may angle downwards from the central wall 331 towards the drain 335 as the first region 333a extends into the first portion 325a of the mixing chamber 325. The wall 333 may include a second region 333b extending in the first portion 325a of the mixing chamber 325 from the first region 333a of the wall 333 towards the drain 335. The second region 333b may be generally planar and/or parallel to the central wall 331 or the sidewall 302. The wall 333 may include a third region extending from the second region 333b at least partially into the second portion 325b of the mixing chamber 325. In some embodiments, the third region 333c of the wall 333 may be connected to or extend from the second region 333b at an area of the second region 333b that is between the first region 333a of the wall 333 and a terminating or distal end of the second region 333b. The third region 333c of the wall 333 may be arched and or angled as the third region 33c extends from the second region 333b of the wall 333 through the opening 3334 and into the second portion 325b of the mixing chamber 325. In some embodiments, the third region 333c may include a face oriented towards the bottom region of the first portion 325a and/or the second portion 325b of the mixing chamber 325.

In some embodiments, the third region 333a of the wall 333 may at least partially define the opening 334 that provides fluid communication between the first portion 325a and the second portion 325b of the mixing chamber 325. The third region 333c may define a path for air to flow from the first portion 325a to the second portion 325b of the chamber 325. In some embodiments, the third region 333c may be positioned in the second portion 325b of the mixing chamber 325 to direct air towards the bottom wall of the housing 323, resulting in additional turbulence of the air flow within the mixing chamber 325 before the air flow rises to the exhaust opening 342.

The kitchen exhaust system 300 may include additional walls or tabs extending inwardly into the mixing chamber 325 and positioned to create turbulence of the air flow formed from the cold air and the grease-laden vapors. In some embodiments, the housing 323 may include a first sidewall 302 and a second sidewall 304 to which the walls 330 or tabs are secured or connected. The first portion 323a of the mixing chamber 325 may be positioned between the first sidewall 302 and the central wall 331, and the second portion 325b of the mixing chamber 325 being positioned between the second sidewall 304 and the central wall 331. In some embodiments, the one or more walls 330 are positioned to create turbulence of the air flow formed from the cold air and the grease-laden vapors includes at least one (e.g., all) of (1) one or more walls 330b-c angled from the first sidewall 302 in the first portion 325a of the mixing chamber 325 and having a face oriented towards the top region of the mixing chamber 325, (2) one or more walls 330a angled from the central wall 331 in the first portion 325a of the mixing chamber 325 and having a face oriented towards the top region of the mixing chamber 325, (3) one or more walls 130e-h angled from the second sidewall 304 in the second portion 325b of the mixing chamber 325 and having a face oriented towards the top region of the mixing chamber 325, (4) one or more walls 330h-i angled from the central wall 331 in the second portion 325b of the mixing chamber 325 and having a face oriented towards the top region of the mixing chamber 325, (5) one or more walls positioned in the first portion 325a of the mixing chamber 325 between the central wall 331 and the first sidewall 302, and/or (6) one or more walls 330j positioned in the second portion 325b of the mixing chamber 325 between the central wall 331 and the second sidewall 304.

FIG. 3D shows a cross-sectional view of the kitchen exhaust system 300. The one or more walls 330 may include vortex generators. In some examples, the kitchen exhaust system 300 having a wall 330a extending from the central wall 331 in the top region of the first portion 325a of the mixing chamber 325 proximate to the cold air intake port 322 such that the air flow of cold air entering the first portion 325a of the mixing chamber intersects with the wall 330a. The kitchen exhaust system 300 may include a wall 330b extending from the sidewall 302 into the top region the first portion 325a of the mixing chamber 325 proximate to the vapor intake port 312 such that the flow of grease-laden vapors entering the first portion 325a of the mixing chamber 325 intersects with the wall 330*b*. The kitchen exhaust system 300 may include a wall 330*c* extending from the sidewall 302 into the first portion 325*a* of the mixing chamber 325 above the wall 333. The kitchen exhaust system 300 may include a wall 330*d* extending from the third region 333*c* of the wall 333 into second portion 325*b* of the mixing chamber 325. The kitchen exhaust system 300 may include walls 330*e-g* extending from the sidewall 304 into the bottom, central, and top regions of the second portion 325*b* of the mixing chamber 325. The kitchen exhaust system 300 may include walls 330*h* and 330*i* extending from the central wall 331 into the top and central regions of the second portion 325*b* of the mixing chamber 325. The kitchen exhaust system 300 may include a wall 330*j* positioned in the second portion 325*b* of the mixing chamber 325 between the sidewall 304 and the central wall 331. Each of the walls 330*a-j* may include a face angling downward from the wall to which they are attached such that grease collecting on the walls 330*a-j* slides from the walls 330*a-j* to the bottom of the mixing chamber 325 and to the drain 335. In some embodiments, the bottom portion of the walls 330*a-j* is generally perpendicular to the wall to which they are attached.

Protrusion of the walls 330*a-j* and the wall 331 into the mixing chamber 325 is effective to create turbulence and mixture of the grease-laden vapor and cold air entering the mixing chamber 325. As turbulence and mixture of the grease-laden vapor and the cold air in the mixing chamber 325 occurs, the grease-laden vapor cools, causing at least a portion of the grease to fall out of the grease-laden vapor, as described above. The vapor may then exit then the mixing chamber 325 through the exhaust opening 342 and the grease may pass through the drain 335 for collection. Although not shown in FIGS. 3A-3F, the kitchen exhaust system 300 may include a collection box positioned below the drain 335 to collect the grease separated from the grease-laden vapors.

Figure 4A:
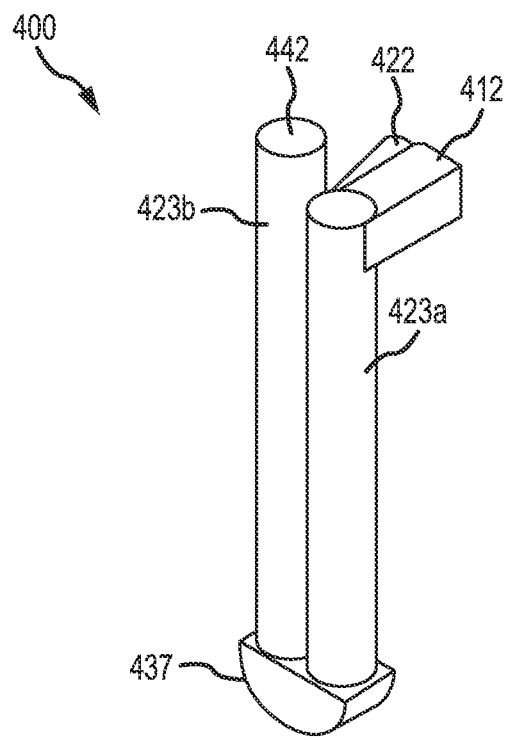
Figure 4B:
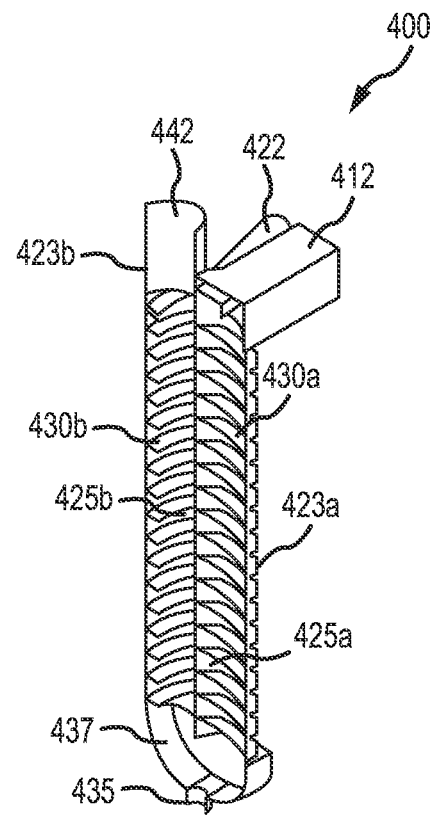

FIGS. 4A-4H are views of a kitchen exhaust system 400, according to an embodiment. Specifically, FIG. 4A is a front isometric view of the kitchen exhaust system 400, FIG. 4B is a front isometric cross-sectional view of the kitchen exhaust system 400, FIG. 4C is a side view of the kitchen exhaust system 400, FIG. 4D is a cross-sectional view of the kitchen exhaust system 400 taken along line 4D-4D in FIG. 4C, FIG. 4E is a front view of the kitchen exhaust system 400, and FIG. 4F is a cross-sectional side view of the kitchen exhaust system 400 taken along line 4F-4F of FIG. 4E, FIG. 4G is a top view of the kitchen exhaust system 400, and FIG. 4H is a cross-sectional top view taken along line 4H-4H of FIG. 4E. Although not shown in FIGS. 4A-4H, one or more (e.g., all) of the hood 105, the vapor passage 110, the sensor 111, the cold air induction system 115, the controller 117, the cold air passage 120, the exhaust passage 145, and/or the exhaust fan 150 may be included with the kitchen exhaust system 400. The kitchen exhaust system 400 may be used or retrofit for use with one or more (e.g., all) of the hood 105, the vapor passage 110, the exhaust passage 145, and/or the exhaust fan 150. Unless otherwise noted, the kitchen exhaust system 400 may include any aspect of the kitchen exhaust systems 100, 200, or 300, such as the materials, components, referenced temperatures, referenced CFMs, and so on.

In some embodiments, the kitchen exhaust system 400 includes a housing comprising a first cylinder 423*a*, a second cylinder 423*b*, and a base 437 connecting the first cylinder 423*a* and the second cylinder 423*b*. The first cylinder 423*a* and the second cylinder 423*b* may be positioned generally adjacent longitudinally to one another. The first cylinder 423*a* may at least partially define a first portion 425*a* of a mixing chamber of the kitchen exhaust system 400, and the second cylinder 423*b* may define a second portion 425*b* of the mixing chamber of the kitchen exhaust system 400. The first portion 425*a* and the second portion 425*b* may be generally cylindrical. Although the housing of the kitchen exhaust system 400 defines two cylindrical portions 425*a*, 425*b* of the mixing chamber, the housing of the kitchen exhaust system 400 may include other shapes and configurations defining a two cylindrical portions 425*a*, 425*b* of the mixing chamber of the kitchen exhaust system 400.

The base 437 may at least partially define a portion of the mixing chamber that fluidly couples the first portion 423*a* and the second portion 423*b* of the mixing chamber. In some embodiments, the kitchen exhaust system 400 includes a vapor intake port 412 on a top region of the first cylinder 423*a* distal to the base 437 and configured to fluidly connect the first portion 325*a* of the mixing chamber with the hood 105 in the cooking or kitchen area. The kitchen exhaust system 400 may include a cold air intake port 422 on the top region of the first cylinder 423*a* and configured to fluidly connect the first portion 325*a* of the mixing chamber with the cold air induction system 115. The kitchen exhaust system 400 may include an exhaust opening 442 on a top region of the second cylinder 423*b* of the kitchen exhaust system 400. The portion of the mixing chamber defined by the base 437 may narrow to a drain 435 in the base 437 distal to the exhaust opening 342. For example, the drain 435 may be positioned at the bottom of an arced portion of the mixing chamber defined by the base 437.

The kitchen exhaust system 400 also includes one or more walls positioned to create turbulence of the air flow formed from the cold air entering the mixing chamber through the cold air intake port 422 and the grease-laden vapors entering the mixing chamber through the vapor intake port 412. The one or more walls positioned to create turbulence of the air flow in the mixing chamber of the kitchen exhaust system 400 may include one or more walls 430*a* extending into the first portion 423*a* of the mixing chamber and forming a helical structure extending at least partially between the vapor intake port 412 (and the cold air intake port 422) and the base 437. In some embodiments, the one or more walls 430*a* forming the helical structure may include a single, continuous wall extending at least partially between the vapor intake port 412 and the base 437. The single wall 430*a* may wrap continuously around an inner surface of the first cylinder 423*a* to form the helical structure that extends at least partially between the vapor intake port 412 and the base 437. As shown in the cross-sectional view of FIG. 4D, the helical structure formed by the wall 430*a* may slope downwards from a distal portion of the first cylinder 423*a* distal to the second cylinder 423*b* to a central portion of the first cylinder 423*a* proximate to the second cylinder 423*b*. In some embodiments, the one or more walls 430*a* forming the helical structure may include multiple walls extending at least partially between the vapor intake port 412 and the base 437 to form the helical structure. For example, the multiple walls may form single, double, triple, etc. helical structures continuously or intermittently extending at least partially between the vapor air intake 412 and the base 437.

The one or more walls positioned to create turbulence of the air flow in the mixing chamber of the kitchen exhaust system 400 may include one or more walls 430*b* extending into the second portion 423*b* of the mixing chamber and forming a helical structure extending at least partially between the base 437 and the exhaust opening 442. In some embodiments, the one or more walls 430*b* forming the helical structure may include a single, continuous wall extending at least partially between the base 437 and exhaust opening 442. The single wall 430*b* may wrap continuously around an inner surface of the second cylinder 423*b* to form the helical structure that extends at least partially between the base 437 and the exhaust opening 442. As shown in the cross-sectional view of FIG. 4D, the helical structure formed by the wall 430*b* may slope downwards from a distal portion of the second cylinder 423*b* distal to the first cylinder 423*a* to a central portion of the second cylinder 423*b* proximate to the first cylinder 423*a*. In some embodiments, the one or more walls 430*b* forming the helical structure may include multiple walls extending at least partially between the base 437 and the exhaust opening 442 to form the helical structure. For example, the multiple walls may form single, double, triple, etc. helical structures continuously or intermittently extending at least partially between the base 437 and the exhaust opening 442.

In some embodiments, multiple kitchen exhaust systems 400 may be placed in a series for use with a single hood 105, similar to that shown in FIG. 5A for the kitchen exhaust system 500. For example, the grease-laden vapors collected by the hood may be diverted into multiple passages and directed to multiple kitchen exhaust systems 400 for removal of grease from the grease-laden vapors. In some embodiments, the vapor exhausted a first kitchen exhaust system 400 may be directed to the vapor intake port 412 of second kitchen exhaust system 400 to provide the grease-laden vapors for the second kitchen exhaust system 400. Each kitchen exhaust system 400 may be associated with an exclusive or individual cold air induction system 115, or a single cold air induction system 115 providing cold air to the multiple kitchen exhaust systems 400.

In operation, the cold air and the grease-laden vapors may enter the first portion 425*a* of the mixing chamber through the cold air intake 422 and the vapor intake 412, respectively. The helical structure formed by the wall 430*a* may create a spinning effect on the cold air and the grease-laden vapors to form an air flow from the combined cold air and grease-laden vapors. The centripetal force on the air flow created by the helical structure also may force grease in the grease laden vapors to adhere to the inner surface of the housing 523*a*. In some embodiments, the grease may then flow down the first portion 525*a* of the mixing chamber and into the base 437, then through the drain 435 into a collection box (not shown). In some embodiments, the at least a portion of the base 437 may be selectively secured to the housing 423 such that the base 437 acts as the collection box.

FIG. 5A is an isometric view of a kitchen exhaust system 500 having a first kitchen exhaust system unit 500*a* and a second kitchen exhaust system unit 500*b*, according to an embodiment. FIG. 5B is a cross-sectional view of either the first kitchen exhaust system unit 500*a* or the second kitchen exhaust system unit 500*b*. Although the kitchen exhaust system 500 shown in FIG. 5A includes two kitchen exhaust system units 500*a*, 500*b*, in some embodiments, the kitchen exhaust system 500 may include only one kitchen exhaust system unit or more than two kitchen exhaust system units. Although not shown in FIGS. 5A-5B, one or more (e.g., all) of the hood 105, the vapor passage 110, the sensor 111, the cold air induction system 115, the controller 117, the cold air passage 120, the exhaust passage 145, and/or the exhaust fan 150 may be included with the kitchen exhaust system 500. The kitchen exhaust system 500 may be used or retrofit for use with one or more (e.g., all) of the hood 105, the vapor passage 110, the exhaust passage 145, and/or the exhaust fan 150. Unless otherwise noted, the kitchen exhaust system 500 may include any aspect of the kitchen exhaust systems 100, 200, 300, 400 such as the materials, components, referenced temperatures, referenced CFMs, and so on. Moreover, although not shown in FIGS. 5A-5B, the kitchen exhaust system 500 may include one or more walls in a mixing chamber forming the helical structure described above in relation to the kitchen exhaust system 400.

In some embodiments, the kitchen exhaust system 500 includes a housing 523 at least partially defining a mixing chamber 525. The housing 523 includes one or more walls positioned to create turbulence of the air flow formed from the cold air and the grease-laden vapors. For example, the housing 523 may include one or more walls 523*b* of the housing 523 defining a conical or frustoconical region 525*b* in the mixing chamber 525. The conical region 525*b* may be positioned between a top region and a bottom region of the mixing chamber 525. In some embodiments, the one or more walls 523*b* of the housing defining the conical region 525*b* of the mixing chamber 525 may include a generally conical-shaped region of the housing 523.

The mixing chamber 525 may include a generally cylindrical region 525*a* at least partially defined by a portion 523*a* of the housing 523. The generally cylindrical region 525*a* of the mixing chamber 525 may be positioned proximate to a wider end of the generally conical region 525*b* of the mixing chamber 525 such that the generally conical region 525*b* of the mixing chamber 525 narrows distal to the generally cylindrical region 525*a* of the mixing chamber 525. In some embodiments, the portion 523*a* of the housing 523 defining the cylindrical region 525*a* of the mixing chamber 525 may be a cylindrical portion 523*a* of the housing 523 connected to a conical shaped region 523*b* of the housing 523.

In some embodiments, the mixing chamber 525 includes an additional generally cylindrical region 525*c* at the narrow end of the generally conical region 525*b* of the mixing chamber 525. The cylindrical region 525*a* (or the wide end of the generally conical region 525*b*) may include a diameter that is at least two, three, four, or five times greater than a diameter of the additional cylindrical region 525*c* (or the narrow end of the generally conical region 525*b*). A portion 523*c* of the housing 523 may define the additional generally cylindrical region 525*c*. The portion 523*c* of the housing 523 defining the additional generally cylindrical region 525*c* may be generally cylindrical or tubular. A central axis 531 may extend through at least one (e.g., all) of the generally conical region 525*b*, the generally cylindrical region 525*a*, and the additional cylindrical region 525*c* of the mixing chamber 525.

In some embodiments, the kitchen exhaust system 500 includes a vapor intake port 512 on a top region (e.g., the generally cylindrical region 525*a*) of the mixing chamber distal to the additional cylindrical region 525*c* and configured to fluidly connect the mixing chamber 525 with the hood 105 in the cooking or kitchen area. The kitchen exhaust system 500 may include a cold air intake port 522 on the top region (e.g., the generally cylindrical region 525*a*) of the mixing chamber and configured to fluidly connect the mixing chamber 525 with the cold air induction system 115. In some embodiments, the vapor intake port 512 is positioned between the cold air intake port 522 and a theoretical plane extending through the central axis 531. The kitchen exhaust system 500 may include an exhaust opening 542 on a top region of the mixing chamber 525. The central axis 531 may be substantially centered within the exhaust opening 542. In some embodiments, one or more (e.g., all) of the cold air intake port 522, the vapor intake port 512, and the exhaust opening 524 are positioned on the portion 523*a* of the housing 523 defining the cylindrical portion 525a of the mixing chamber 525, such that the cold air and the grease-laden vapors enter the mixing chamber 525 in the generally cylindrical region 525a of the mixing chamber 525 and the vapors exit the mixing chamber 525 through the exhaust opening 542 in the cylindrical region 525a of the mixing chamber 525.

The kitchen exhaust system 500 also includes a drain 535, according to an embodiment. The drain 535 may be positioned generally distal to the cold air intake port 522 and the vapor intake port 512. In some embodiments, the kitchen exhaust system 500 includes a base 537 positioned between the drain 535 and the mixing chamber 525. The base 537 may widen from the additional cylindrical region 525c of the mixing chamber 525 and/or the narrow end of the generally conical region 525b of the mixing chamber 525. In some embodiments, the base 537 defines a collection chamber that narrows to the drain 535. For example, the base 537 may define a collection chamber having (1) a cylindrical region proximate to the additional cylindrical region 525c and/or the narrow end of the generally conical region 525b and (2) a conical or narrowing region that extends between the cylindrical region of the collection chamber and the drain 535. The cylindrical region of the collection chamber in the base 537 have a diameter substantially equal to the cylindrical region 525a and/or wide end of the conical region 525b of the mixing chamber.

In operation, the cold air and the grease-laden vapors may enter the mixing chamber 525 through the cold air intake 522 and the vapor intake 512, respectively. The cold air and the grease-laden vapors may combine to form an air flow and, due to the shape of the mixing chamber 525, progress from the wide end of the conical region 525b to the narrow end of the conical region 525. When the air flow reaches the narrow end of the conical region 525b, the air flow may be forced up through the center of the mixing chamber 525, following the axis 531 through the mixing chamber 525 and the exhaust opening 542 to exit the mixing chamber 525. Grease from the grease-laden vapors that is cooled when mixing with the cold air may adhere to the wall 523b defining the conical region 525b, before sliding down the walls 523b, through the portion 523c and into the collection chamber of the base 537. In some embodiments, the grease may then flow through the drain 535 into a collection box (not shown). In some embodiments, the base 537 may be selectively secured to the housing 523 such that the base 537 acts as the collection box.

In some embodiments, multiple kitchen exhaust system units 500a, 500b may be placed in a series for use with a single hood 105 to form the kitchen exhaust system 500. For example, the grease-laden vapors collected by the hood 105 may be diverted into multiple passages and directed to multiple kitchen exhaust system unit 500a, 500b for removal of grease from the grease-laden vapors. In some embodiments, the vapor exhausted the first kitchen exhaust system 500a may be directed to the vapor intake port 512 of the second kitchen exhaust system unit 500b to provide the grease-laden vapors for the second kitchen exhaust system unit 500b. Each kitchen exhaust system 500 may be associated with an exclusive or individual cold air induction system 115, or a single cold air induction system 115 providing cold air to the multiple kitchen exhaust systems 500.

Figure 6:
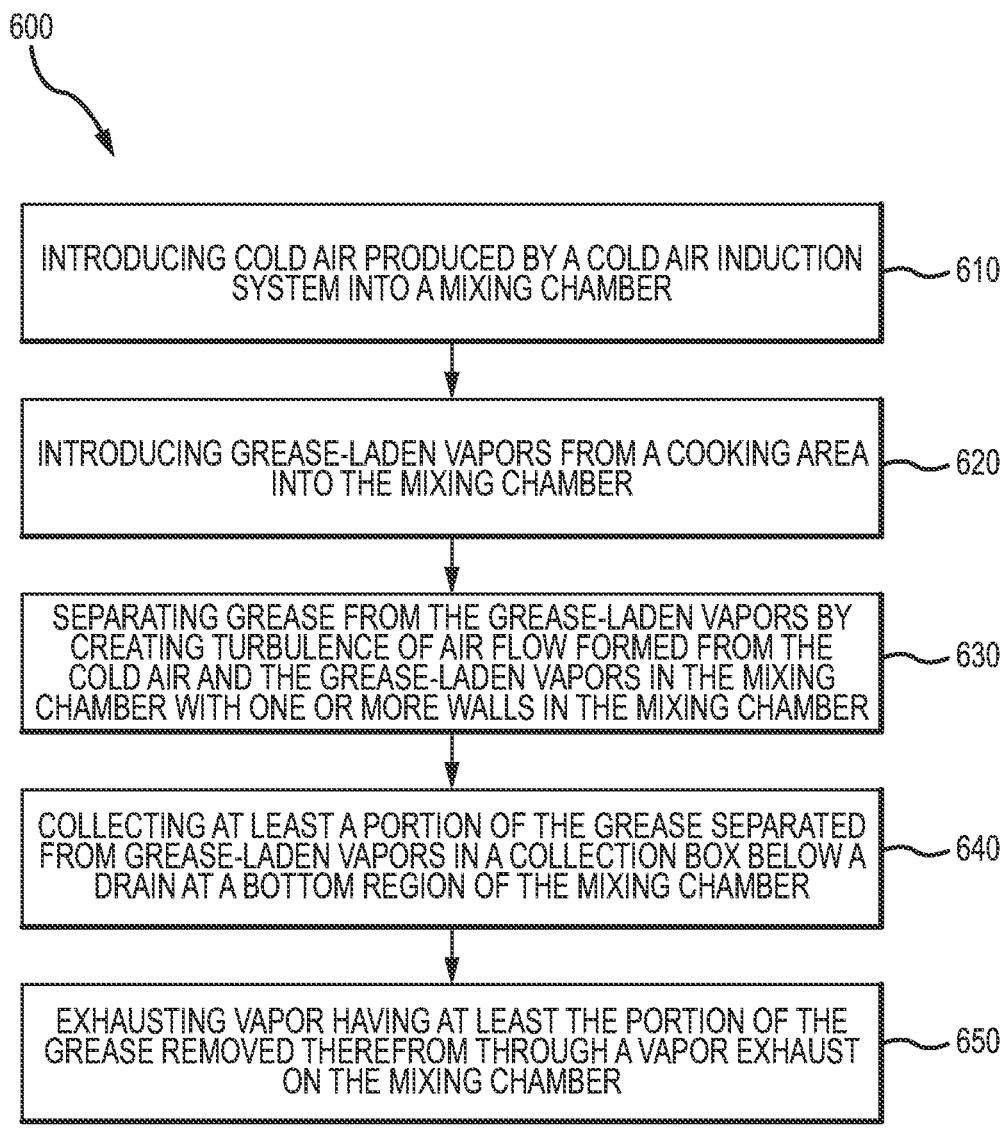
FIG. 6 is a flowchart of a method of separating grease from grease-laden vapors, according to an embodiment.

FIG. 6 is a flow diagram of a method 600 for separating grease from grease-laden vapors, according to an embodiment. The method 600 may include use of any of the kitchen exhaust systems 100, 200, 300, 400, 500 described herein. In an embodiment, the method includes an act 610 of introducing grease-laden vapors from a cooking area into a mixing chamber at least partially defined by a housing. The method 600 also includes an act 620 of introducing cold air produced by a cold air induction system into the mixing chamber. The method 600 also includes an act 630 of separating grease from the grease-laden vapors by creating turbulence of air flow formed from the cold air and the grease-laden vapors in the mixing chamber with one or more walls in the mixing chamber. The method 600 also may include an act 640 of collecting at least a portion of the grease separated from grease-laden vapors in a collection box below a drain at a bottom region of the mixing chamber. The method 600 also may include an act 650 of exhausting vapor having at least the portion of the grease removed therefrom through a vapor exhaust on the mixing chamber.

In some embodiments of the method 600, the act 620 of introducing grease-laden vapors from a cooking area into a mixing chamber may include introducing the grease-laden vapors from the cooking area into the mixing chamber through funneling walls positioned at a cold air intake port on the housing. In some embodiments of the method 600, the act 610 of introducing cold air produced by a cold air induction system into the mixing chamber may include introducing the cold air produced by the cold air induction system into the mixing chamber through funneling walls positioned at a vapor intake port on the housing. In some embodiments, the act 630 of separating grease from the grease-laden vapors by creating turbulence of air flow formed from the cold air and the grease-laden vapors in the mixing chamber with one or more walls in the mixing chamber may include separating the grease from the grease-laden vapors by creating turbulence of the air flow formed from the cold air and the grease-laden vapors in the mixing chamber with at least a first wall secured to a sidewall of the housing and having a face oriented towards the cold air intake port and a second wall positioned between the cold air intake and the sidewall, the second wall having a face oriented towards the vapor intake port. For example, the method 600 may include use of the kitchen exhaust system 100.

In some embodiments of the method 600, the act 630 of separating grease from the grease-laden vapors by creating turbulence of air flow formed from the cold air and the grease-laden vapors in the mixing chamber with one or more walls in the mixing chamber may include separating grease from the grease-laden vapors by creating turbulence of air flow formed from the cold air and the grease-laden vapors in the mixing chamber with a plurality of interior walls positioned in the mixing chamber to form a plurality of turns in the air flow. For example, the method 600 may include use of the kitchen exhaust system 200.

In some embodiments, the method 600 may further comprising an act of separating grease from the grease-laden vapors by creating turbulence of air flow formed from the cold air and the grease-laden vapors in the mixing chamber with one or more air foils positioned in the mixing chamber. In some embodiments, the method 600 may further comprising an act of separating grease from the grease-laden vapors by creating turbulence of air flow formed from the cold air and the grease-laden vapors in the mixing chamber with one or more cylinders positioned in the mixing chamber.

In some embodiments of the method 600, the act 630 of separating grease from the grease-laden vapors by creating turbulence of air flow formed from the cold air and the grease-laden vapors in the mixing chamber with one or more walls in the mixing chamber may include separating grease from the grease-laden vapors by creating turbulence of air flow formed from the cold air and the grease-laden vapors in the mixing chamber with at least a first wall extending from a central wall in the mixing chamber into a first portion of the chamber and having a face at least partially oriented towards a cold air intake port and a vapor intake port. More particularly, separating grease from the grease-laden vapors by creating turbulence of air flow formed from the cold air and the grease-laden vapors in the mixing chamber with one or more walls in the mixing chamber may include separating grease from the grease-laden vapors by creating turbulence of the air flow formed from the cold air and the grease-laden vapors in the mixing chamber with at least one of (1) one or more walls angled from a first sidewall in the first portion of the mixing chamber and having a face oriented towards a top region of the mixing chamber, (2) one or more walls angled from the central wall in the first portion of the mixing chamber and having a face oriented towards the top region of the mixing chamber, (3) one or more walls angled from a second sidewall in a second portion of the mixing chamber and having a face oriented towards the top region of the mixing chamber, and/or (4) one or more walls angled from the central wall in the second portion of the mixing chamber and having a face oriented towards the top region of the mixing chamber. For example, the method 600 may include use of the kitchen exhaust system 300.

In some embodiments of the method 600, the act 630 of separating grease from the grease-laden vapors by creating turbulence of air flow formed from the cold air and the grease-laden vapors in the mixing chamber with one or more walls in the mixing chamber may include separating the grease from the grease-laden vapors by creating turbulence of the air flow formed from the cold air and the grease-laden vapors in the mixing chamber with one or more walls extending into a first portion of the mixing chamber defined by a first cylinder and forming a helical structure extending at least partially between a vapor intake port on the first cylinder and a base. The method 600 also may include an act of separating the grease from the grease-laden vapors by creating turbulence of the air flow formed from the cold air and the grease-laden vapors in the mixing chamber with one or more walls extending into a second portion of the mixing chamber defined by the second cylinder and forming a helical structure extending at least partially between a vapor exhaust on the second cylinder and the base. For example, the method 600 may include use of the kitchen exhaust system 400.

In some embodiments of the method 600, the act 630 of separating grease from the grease-laden vapors by creating turbulence of air flow formed from the cold air and the grease-laden vapors in the mixing chamber with one or more walls in the mixing chamber may include separating the grease from the grease-laden vapors by creating turbulence of the air flow formed from the cold air and the grease-laden vapors in the mixing chamber with one or more walls of the housing defining a conical region in the mixing chamber positioned between a top region and a bottom region of the mixing chamber. For example, the method 600 may include use of the kitchen exhaust system 500.

In some embodiments, the method 600 may further include coordinating with a controller production of the cold air at one or more of a selected CFM rate and/or a selected temperature based on one or more of a temperature of grease-laden vapors or a volume of the grease-laden vapors. In some embodiments, the method 600 may further include an act of heating the grease separated from the grease-laden vapor with a heating element secured to the housing proximate to the base region of the mixing chamber.

The acts of the method 600 described above are for illustrative purposes. For example, the acts of the method 600 can be performed in different orders, split into multiple acts, modified, supplemented, or combined. In an embodiment, one or more of the act of the method 600 can be omitted from the method 600. Any of the acts of the method 600 can include using any of the kitchen exhaust systems disclosed herein.

As used herein, the term "about" or "substantially" refers to an allowable variance of the term modified by "about" or "substantially" by ±10% or ±5%. Further, the terms "less than," "or less," "greater than," "more than," or "or more" include, as an endpoint, the value that is modified by the terms "less than," "or less," "greater than," "more than," or "or more."

Features from any of the disclosed embodiments may be used in combination with one another, without limitation. In addition, other features and advantages of the present disclosure will become apparent to those of ordinary skill in the art through consideration of the detailed description and the accompanying drawings. While various aspects and embodiments have been disclosed herein, other aspects and embodiments are contemplated. The various aspects and embodiments disclosed herein are for purposes of illustration and are not intended to be limiting.

What is claimed is:

1. A kitchen exhaust system, comprising:
a housing at least partially defining a mixing chamber and having:
a vapor intake port adapted to fluidly couple to a hood that collects grease-laden vapors from a cooking area effective to receive the grease-laden vapors from the cooking area;
a cold air intake adapted to fluidly couple to a cold air induction system that produces cold air effective to receive the cold air produced by the cold air induction system;
one or more walls positioned to create turbulence of air flow formed from the cold air and the grease-laden vapors, wherein the cold air and the turbulence of the air flow separate at least a portion of grease from the grease-laden vapors;
a drain positioned at a bottom region of the mixing chamber to collect the at least the portion of the grease from the grease-laden vapors that has been separated;
a vapor exhaust positioned at a top region of the mixing chamber distal to the bottom region to allow vapors to exit the mixing chamber, the vapors having the at least the portion of the grease from the grease-laden vapors removed; and
funneling walls positioned at the cold air intake and angled toward one another in the chamber.

2. The kitchen exhaust system of claim 1, wherein:
the housing includes a sidewall distal to the vapor intake port; and
the one or more walls positioned to create turbulence of the air flow formed from the cold air and the grease-laden vapors includes at least a first wall secured to the sidewall and having a face oriented towards the cold air intake.

3. The kitchen exhaust system of claim 2, wherein the one or more walls positioned to create turbulence of the air flow formed from the cold air and the grease-laden vapors includes at least a second wall positioned between the cold air intake and the sidewall, the second wall having a face oriented towards the vapor intake port.

4. The kitchen exhaust system of claim 1, wherein the one or more walls positioned to create turbulence of the air flow formed from the cold air and the grease-laden vapors includes a plurality of interior walls positioned in the mixing chamber to form a plurality of turns in the air flow.

5. The kitchen exhaust system of claim 4, further comprising one or more air foils positioned in the mixing chamber.

6. The kitchen exhaust system of claim 5, further comprising one or more cylinders positioned in the mixing chamber, wherein at least two interior walls of the plurality of interior walls angled towards one another.

7. The kitchen exhaust system of claim 1, wherein:
the housing includes a central wall extending at least partially between the top region and the bottom region of the mixing chamber, the central wall dividing a first portion of the mixing chamber and a second portion of the mixing chamber;
the vapor intake port and the cold air intake are positioned in the first portion and top region of the mixing chamber;
the drain is positioned in the first portion and the bottom region of the mixing chamber; and
the vapor exhaust is positioned in second portion and the top region of the mixing chamber.

8. The kitchen exhaust system of claim 7, wherein the one or more walls positioned to create turbulence of the air flow formed from the cold air and the grease-laden vapors includes at least a first wall extending from the central wall into the first portion of the chamber and having a face at least partially oriented towards the cold air intake and the vapor intake port.

9. The kitchen exhaust system of claim 8, wherein:
the central wall at least partially defines an opening providing fluid communication between the first portion of the mixing chamber and the second portion of the mixing chamber; and
the first wall includes a first region including the face at least partially oriented towards the cold air intake and the vapor intake port, a second region extending in the first portion of the chamber from the first region of the first wall towards the drain, and a third region extending from the second region at least partially into the second portion of the mixing chamber, wherein the third region includes a face oriented towards the bottom region of the mixing chamber.

10. The kitchen exhaust system of claim 9, wherein:
the housing includes a first sidewall and a second sidewall, the first portion of the mixing chamber being positioned between the first sidewall and the central wall and the second portion of the mixing chamber being positioned between the second sidewall and the central wall;
the one or more walls positioned to create turbulence of the air flow formed from the cold air and the grease-laden vapors includes:
one or more walls angled from the first sidewall in the first portion of the mixing chamber and having a face oriented towards the top region of the mixing chamber;
one or more walls angled from the central wall in the first portion of the mixing chamber and having a face oriented towards the top region of the mixing chamber;
one or more walls angled from the second sidewall in the second portion of the mixing chamber and having a face oriented towards the top region of the mixing chamber; and
one or more walls angled from the central wall in the second portion of the mixing chamber and having a face oriented towards the top region of the mixing chamber.

11. The kitchen exhaust system of claim 1, wherein:
the housing includes a first housing member defining a first cylindrical portion of the mixing chamber, a second housing member defining a second cylindrical portion of the mixing chamber, and a base fluidly coupling the first cylinder and the second cylinder;
the vapor intake port and the cold air intake are positioned on the first housing member generally distal to the base;
the drain is positioned on the base; and
the vapor exhaust is positioned on the second housing member generally distal to the base.

12. The kitchen exhaust system of claim 11, wherein the one or more walls positioned to create turbulence of the air flow formed from the cold air and the grease-laden vapors includes one or more walls extending into the first cylindrical portion of the mixing chamber and forming a helical structure extending at least partially between the vapor intake port and the base.

13. The kitchen exhaust system of claim 12, wherein the one or more walls positioned to create turbulence of the air flow formed from the cold air and the grease-laden vapors includes one or more walls extending into the second cylindrical portion of the mixing chamber and forming a helical structure extending at least partially between the vapor exhaust and the base.

14. The kitchen exhaust system of claim 1, wherein the one or more walls positioned to create turbulence of the air flow formed from the cold air and the grease-laden vapors includes one or more walls of the housing defining a conical region in the mixing chamber positioned between the top region and the bottom region.

15. The kitchen exhaust system of claim 14, wherein the housing includes a cylindrical portion defining at least partially defining the top region of the mixing chamber, the cold air intake and the vapor intake port being positioned on the cylindrical portion of the housing.

16. The kitchen exhaust system of claim 15, wherein the vapor exhaust is positioned on the cylindrical portion of the housing with a central axis of the cylindrical portion of the housing and the conical region of the mixing chamber extending through the vapor exhaust.

17. The kitchen exhaust system of claim 16, wherein the vapor intake port is positioned between the cold air intake and a theoretical plane formed by the central axis.

18. The kitchen exhaust system of claim 1, further comprising funneling walls positioned at the vapor intake port and angled toward one another in the chamber.

19. The kitchen exhaust system of claim 1, further comprising a heating element secured to the housing proximate to a base region of the mixing chamber.

20. The kitchen exhaust system of claim 1, further comprising the hood configured to the collect grease-laden vapors from the cooking area, a vapor passage providing fluid communication between the hood and the vapor intake port, and the cold air induction system configured to produce the cold air and in fluid communication with the cold air intake, wherein the cold air is between about −20° C. and about 20° C.

21. The kitchen exhaust system of claim 20, further comprising an additional housing at least partially defining an additional mixing chamber and having:
- an additional vapor intake port fluidly coupled to the hood vapor exhaust of the housing to receive the vapors having the at least the portion of the grease removed from the housing;
- an additional cold air intake fluidly coupled to at least one of the cold air induction system or an additional cold air induction system that produces additional cold air effective to receive the additional cold air;
- one or more additional walls positioned to create additional turbulence of air flow formed from the additional cold air and the vapors having the at least the portion of the grease removed, wherein the additional cold air and the additional turbulence of the air flow separate at least a portion of additional grease from the vapors having the at least the portion of the grease removed in the additional mixing chamber;
- an additional drain positioned at a bottom region of the additional mixing chamber to collect the at least the portion of the additional grease from the vapors having the at least the portion of the grease removed in the additional mixing chamber; and
- an additional vapor exhaust positioned at a top region of the additional mixing chamber distal to the bottom region of the additional mixing chamber to allow additional vapors to exit the additional mixing chamber, the additional vapors having at least the portion of the additional grease from the vapors removed.

22. A method of separating grease from grease-laden vapors, the method comprising:
- introducing grease-laden vapors from a cooking area into a mixing chamber at least partially defined by a housing;
- introducing cold air that is about −20° C. to about 20° C. and produced by a cold air induction system into the mixing chamber through funneling walls positioned at a cold air intake port on the housing;
- separating grease from the grease-laden vapors by creating turbulence of air flow formed from the cold air and the grease-laden vapors in the mixing chamber with one or more walls in the mixing chamber;
- collecting at least a portion of the grease from the grease-laden vapors in a collection box below a drain at a bottom region of the mixing chamber; and
- exhausting vapors through a vapor exhaust on the mixing chamber, the vapors having at least the portion of the grease from the grease-laden vapors removed.

23. The method of claim 22, wherein introducing cold air produced by the cold air induction system into the mixing chamber includes introducing the cold air produced by the cold air induction system into the mixing chamber through funneling walls positioned at a vapor intake port on the housing.

24. The method of claim 23, wherein separating grease from the grease-laden vapors by creating turbulence of air flow formed from the cold air and the grease-laden vapors in the mixing chamber with the one or more walls in the mixing chamber includes separating the grease from the grease-laden vapors by creating turbulence of the air flow formed from the cold air and the grease-laden vapors in the mixing chamber with at least a first wall secured to a sidewall of the housing and having a face oriented towards the cold air intake port and a second wall positioned between the cold air intake and the sidewall, the second wall having a face oriented towards the vapor intake port.

25. The method of claim 23, wherein separating grease from the grease-laden vapors by creating turbulence of air flow formed from the cold air and the grease-laden vapors in the mixing chamber with the one or more walls in the mixing chamber includes separating grease from the grease-laden vapors by creating turbulence of air flow formed from the cold air and the grease-laden vapors in the mixing chamber with a plurality of interior walls positioned in the mixing chamber to form a plurality of turns in the air flow.

26. The method of claim 25, further comprising separating grease from the grease-laden vapors by creating turbulence of air flow formed from the cold air and the grease-laden vapors in the mixing chamber with one or more air foils positioned in the mixing chamber.

27. The method of claim 26, further comprising separating grease from the grease-laden vapors by creating turbulence of air flow formed from the cold air and the grease-laden vapors in the mixing chamber with one or more cylinders positioned in the mixing chamber.

28. The method of claim 22, wherein separating grease from the grease-laden vapors by creating turbulence of air flow formed from the cold air and the grease-laden vapors in the mixing chamber with the one or more walls in the mixing chamber includes separating grease from the grease-laden vapors by creating turbulence of air flow formed from the cold air and the grease-laden vapors in the mixing chamber with at least a first wall extending from a central wall in the mixing chamber into a first portion of the chamber and having a face at least partially oriented towards a cold air intake port and a vapor intake port.

29. The method of claim 28, wherein separating grease from the grease-laden vapors by creating turbulence of air flow formed from the cold air and the grease-laden vapors in the mixing chamber with the one or more walls in the mixing chamber includes separating grease from the grease-laden vapors by creating turbulence of the air flow formed from the cold air and the grease-laden vapors in the mixing chamber with:
- one or more walls angled from a first sidewall in the first portion of the mixing chamber and having a face oriented towards a top region of the mixing chamber;
- one or more walls angled from the central wall in the first portion of the mixing chamber and having a face oriented towards the top region of the mixing chamber;
- one or more walls angled from a second sidewall in a second portion of the mixing chamber and having a face oriented towards the top region of the mixing chamber; and
- one or more walls angled from the central wall in the second portion of the mixing chamber and having a face oriented towards the top region of the mixing chamber.

30. The method of claim 22, wherein separating grease from the grease-laden vapors by creating turbulence of air flow formed from the cold air and the grease-laden vapors in the mixing chamber with the one or more walls in the mixing chamber includes separating the grease from the grease-laden vapors by creating turbulence of the air flow formed from the cold air and the grease-laden vapors in the mixing chamber with the one or more walls extending into a first portion of the mixing chamber defined by a first cylinder and forming a helical structure extending at least partially between a vapor intake port on the first cylinder and a base.

31. The method of claim 30, further comprising separating the grease from the grease-laden vapors by creating turbulence of the air flow formed from the cold air and the grease-laden vapors in the mixing chamber with the one or more walls extending into a second portion of the mixing chamber defined by a second cylinder and forming a helical structure extending at least partially between a vapor exhaust on the second cylinder and the base.

* * * * *